(12) United States Patent
Seo et al.

(10) Patent No.: US 12,131,528 B2
(45) Date of Patent: Oct. 29, 2024

(54) DEVICE FOR DETECTING AN OBJECT USING FEATURE TRANSFORMATION AND METHOD THEREOF

(71) Applicants: SK hynix Inc., Icheon (KR); Korea Advanced Institute of Science and Technology, Daejeon (KR)

(72) Inventors: Jun Seo, Daejeon (KR); Younghyun Park, Daejeon (KR); Jaekyun Moon, Daejeon (KR)

(73) Assignees: SK hynix Inc., Icheon (KR); Korea Advanced Institute of Science and Technology, Daejeon (KR)

(*) Notice: Subject to any disclaimer, the term of this patent is extended or adjusted under 35 U.S.C. 154(b) by 461 days.

(21) Appl. No.: 17/454,029

(22) Filed: Nov. 8, 2021

(65) Prior Publication Data
US 2022/0261576 A1 Aug. 18, 2022

(30) Foreign Application Priority Data
Feb. 15, 2021 (KR) .................. 10-2021-0020090

(51) Int. Cl.
*G06V 20/00* (2022.01)
*G06F 18/214* (2023.01)
*G06N 3/045* (2023.01)
*G06N 3/048* (2023.01)

(52) U.S. Cl.
CPC .......... *G06V 20/00* (2022.01); *G06F 18/214* (2023.01); *G06N 3/045* (2023.01); *G06N 3/048* (2023.01)

(58) Field of Classification Search
CPC .. G06V 20/00; G06V 10/7715; G06V 10/774; G06V 20/56; G06V 10/40; G06F 18/214; G06N 3/045; G06N 3/048; G06N 3/08; G06T 3/4084
See application file for complete search history.

(56) References Cited

U.S. PATENT DOCUMENTS

2020/0202128 A1 6/2020 Liu et al.
2020/0286241 A1 9/2020 Roy Chowdhury et al.

OTHER PUBLICATIONS

Tsang, S.-H. (2019). Review: DeepLabv3+-Atrous Separable Convolution (Semantic Segmentation). medium.com, 8. (Year: 2019).*
M. Feng, H. Lu and E. Ding, "Attentive Feedback Network for Boundary-Aware Salient Object Detection," 2019 IEEE/CVF Conference on Computer Vision and Pattern Recognition (CVPR), Long Beach, CA, USA, 2019, pp. 1623-1632, doi: 10.1109/ CVPR.2019. 00172. (Year: 2019).*
X. Ying, X. Li and M. C. Chuah, "Weakly-supervised Object Representation Learning for Few-shot Semantic Segmentation," 2021 IEEE Winter Conference on Applications of Computer Vision (WACV), Waikoloa, HI, USA, 2021, pp. 1496-1505, doi: 10.1109/ WACV48630.2021.00154. (Year: 2021).*

(Continued)

*Primary Examiner* — Ross Varndell

(57) ABSTRACT

An object detecting device includes a feature extracting circuit configured to extract first feature data from an input image; a feature transforming circuit configured to transform the first feature data into transformed feature data according to a transformation function; and a decoder circuit configured to decode the transformed feature data into a region map indicating a detected object.

16 Claims, 9 Drawing Sheets

(56) References Cited

OTHER PUBLICATIONS

Yoon, S., Seo, J., & Moon, J. (2019). TapNet: Neural Network Augmented with Task-Adaptive Projection for Few-Shot Learning. ArXiv, abs/1905.06549. (Year: 2019).*
T. Wei et al., "Fss-1000: A 1000-class dataset for few-shot segmentation", arXiv preprint arXiv:1907, 12347, 2019.
S. Xie et al., "Holistically-nested edge detection", Proceedings of the IEEE international conference on computer vision, 2015, pp. 1395-1403.
B. Yang et al., "Prototype mixture models for few-shot semantic segmentation", arXiv preprintarXiv:2008.03898, 2020.
S. Yoon et al., "Tapnet: Neural network augmented with task-adaptive projection for few-shot learning", arXiv preprint arXiv:1905.06549, 2019.
J. Yosinski et al., "Understanding neural networks through deep visualization", arXiv preprint arXiv:1506.06579, 2015.
X. Yu et al., Vehicle localization by aggregating semantic edges, 2018 IEEE/RSJ International Conference on Intelligent Robots and Systems (IROS), 2018, pp. 3196-3203, IEEE.
Z. Yu et al., "Casenet: Deep category-aware semantic edge detection", Proceedings of the IEEE Conference on Computer Vision and Pattern Recognition, 2017, pp. 5964-5973.
Z. Yu et al., "Generalized transitive distance with minimum spanning random forest", IJCAI, 2015, pp. 2205-2211, Citeseer.
Z. Yu et al., "Simultaneous edge alignment and learning", Proceedings of the European Conference on Computer Vision (ECCV), 2018, pp. 388-404.
C. Zhang et al., "Canet: Class-agnostic segmentation networks with iterative refinement and attentive few-shot learning", Proceedings of the IEEE Conference on Computer Vision and Pattern Recognition, 2019, pp. 5217-5226.
X. Zhang et al., "Sg-one: Similarity guidance network for one-shot semantic segmentation", arXiv preprint arXiv:1810.09091, 2018.
D. Zhu et al., "Semantic edge based disparity estimation using adaptive dynamic programming for binocular sensors", Sensors 18(4), 1074, 2018.
H. Abbass et al. "Edge detection of medical images using markov basis", Applied Mathematical Sciences 11(37), Jul. 10, 2017, pp. 1825-1833, vol. 11, 2017, No. 37.
D. Acuna et al., "Devil is in the edges: Learning semantic boundaries from noisy annotations", Proceedings of the IEEE Conference on Computer Vision and Pattern Recognition, 2019, pp. 11075-11083.
Arbelaez et al., "Contour detection and hierarchical image segmentation", IEEE transactions on pattern analysis and machine intelligence 33(5), 2010, pp. 898-916.
G. Bertasius et al. "Deepedge: A multi-scale bifurcated deep network for top-down contour detection", in Proceedings of the IEEE conference on computer vision and pattern recognition, 2015, pp. 4380-4389.
G. Bertasius et al., "High-for-low and low-for-high: Efficient boundary detection from deep object features and its applications to high-level vision", in Proceedings of the IEEE International Conference on Computer Vision. pp. 504-512, 2015.
G. Bertasius et al., "Semantic segmentation with boundary neural fields", in: Proceedings of the IEEE conference on computer vision and pattern recognition, 2016, pp. 3602-3610.
Canny, J., "A computational approach to edge detection", IEEE Transactions on pattern analysis and machine intelligence (6), 1986, pp. 679-698.
L.C. Chen et al., "Semantic image segmentation with task-specific edge detection using cnns and a discriminatively trained domain transform", Proceedings of the IEEE conference on computer vision and pattern recognition, 2016, pp. 4545-4554.
L.C. Chen et al., "Deeplab: Semantic image segmentation with deep convolutional nets, atrous convolution, and fully connected crfs", IEEE transactions on pattern analysis and machine intelligence 40(4), 2017, pp. 834-848.
M. Cordts et al., "The cityscapes dataset for semantic urban scene understanding", Proceedings of the IEEE conference on computer vision and pattern recognition, 2016, pp. 3213-3223.
R. Deng et al., "Learning to predict crisp boundaries", Proceedings of the European Conference on Computer Vision (ECCV), 2018, pp. 562-578.
N. Dong et al., "Few-shot semantic segmentation with prototype learning", BMVC. vol. 3, 2018.
M Feng et al., "Attentive feedback network for boundary-aware salient object detection", Proceedings of the IEEE Conference on Computer Vision and Pattern Recognition, 2019, pp. 1623-1632.
V Ferrari et al., "Groups of adjacent contour segments for object detection", IEEE transactions on pattern analysis and machine intelligence 30(1), 2007, pp. 36-51.
M. Fink, "Object classification from a single example utilizing class relevance metrics", Advances in neural information processing systems, 2005, pp. 449-456.
C. Finn et al., "Model-agnostic meta-learning for fast adaptation of deep networks", Proceedings of the 34th International Conference on Machine Learning—vol. 70, 2017, pp. 1126-1135, JMLR. org.
K. Fu et al., "Meta-ssd: Towards fast adaptation for few-shot object detection with meta-learning", IEEE Access 7, 2019, pp. 77597-77606.
S. Gidaris et al., "Dynamic few-shot visual learning without forgetting", Proceedings of the IEEE Conference on Computer Vision and Pattern Recognition, 2018, pp. 4367-4375.
E.R.Hancock et al., "Edge-labeling using dictionary-based relaxation", IEEE Transactions on Pattern Analysis and Machine Intelligence 12(2), 1990, pp. 165-181.
B. Hariharan et al., Semantic contours from inverse detectors. In: 2011 International Conference on Computer Vision, 2011, pp. 991-998, IEEE.
J. He et al., "Bi-directional cascade network for perceptual edge detection", Proceedings of the IEEE Conference on Computer Vision and Pattern Recognition, 2019, pp. 3828-3837.
R. Hou et al., "Cross attention network for few-shot classification", Advances in Neural Information Processing Systems, 2019, pp. 4005-4016.
Y. Hu et al., "Dynamic feature fusion for semantic edge detection", arXiv preprint arXiv:1902.09104, 2019.
J.J. Hwang et al., "Pixel-wise deep learning for contour detection" arXiv preprint arXiv:1504.01989, 2015.
P. Isola et al., "Image-to-image translation with conditional adversarial networks", Proceedings of the IEEE conference on computer vision and pattern recognition, 2017, pp. 1125-1134.
B. Kang et al., "Few-shot object detection via feature reweighting", Proceedings of the IEEE International Conference on Computer Vision, 2019, pp. 8420-8429.
L. Karlinsky et al., "Repmet: Representative-based metric learning for classification and few-shot object detection", Proceedings of the IEEE Conference on Computer Vision and Pattern Recognition, 2019, pp. 5197-5206.
D.P. Kingma et al., "A method for stochastic optimization", arXiv preprint arXiv:1412.6980, 2014.
G. Koch et al., "Siamese neural networks for one-shot image recognition", ICML deep learning workshop. vol. 2. Lille, 2015.
S.M. Kye et al., "Meta-Learned Confidence for Few-shot Learning", arXiv:2002.12017v2, 2020.
Y. Lifchitz et al., "Dense classification and implanting for few-shot learning", Proceedings of the IEEE Conference on Computer Vision and Pattern Recognition, 2019, pp. 9258-9267.
Y. Liu et al., "Learning to propagate labels: Transductive propagation network for few-shot learning", International Conference on Learning Representations, 2019, https://openreview.net/forum?id=SyVuRiC5K7.
Y Liu et al., "Semantic edge detection with diverse deep supervision", arXiv preprint arXiv:1804.02864, 2018.
Y. Liu et al., "Richer convolutional features for edge detection", Proceedings of the IEEE conference on computer vision and pattern recognition, 2017, pp. 3000-3009.
I. Loshchilov et al., "Decoupled weight decay regularization", arXiv preprint arXiv:1711.05101, 2017.

(56) References Cited

OTHER PUBLICATIONS

J. Mehena, "Medical image edge detection using modified morphological edge detection approach", 2019.

M. Prasad et al., Learning class-specific edges for object detection and segmentation, Computer Vision, Graphics and Image Processing, 2006, pp. 94-105, Springer.

H. Qi et al., "Low-shot learning with imprinted weights", Proceedings of the IEEE conference on computer vision and pattern recognition, 2018, pp. 5822-5830.

K. Rakelly et al., "Conditional networks for few-shot semantic segmentation", 2018.

S. Ravi et al., "Optimization as a model for few-shot learning", 2016.

A. Santoro et al., "Meta-learning with memory-augmented neural networks", International conference on machine learning, 2016, pp. 1842-1850.

A. Shaban et al., "One-shot learning for semantic segmentation", arXiv preprint arXiv:1709.03410, 2017.

J. Snell et al., "Prototypical networks for few-shot learning", Advances in neural information processing systems, 2017, pp. 4077-4087.

K. Sugihara, "Machine interpretation of line drawings", The Massachusetts Institute of Technology, 1986.

F. Sung et al., "Learning to compare: Relation network for few-shot learning", Proceedings of the IEEE Conference on Computer Vision and Pattern Recognition, pp. 1199-1208, 2018.

S. Ullman et al., "Recognition by linear combination of models", Tech. rep., Massachusetts Inst of Tech Cambridge Artificial Intelligence Lab, 1989.

O. Vinyals et al., "Matching networks for one shot learning", Advances in neural information processing systems, 2016, pp. 3630-3638.

S. Wang et al., "Lost shopping! Monocular localization in large indoor spaces", Proceedings of the IEEE International Conference on Computer Vision, 2015, pp. 2695-2703.

K. Wang et al., "Panet: Few-shot image semantic segmentation with prototype alignment", Proceedings of the IEEE International Conference on Computer Vision, 2019, pp. 9197-9206.

T.C. Wang et al., "High-resolution image synthesis and semantic manipulation with conditional gans", Proceedings of the IEEE conference on computer vision and pattern recognition, 2018, pp. 8798-8807.

\* cited by examiner

DEVICE FOR DETECTING AN OBJECT USING FEATURE TRANSFORMATION AND METHOD THEREOF

CROSS-REFERENCE TO RELATED APPLICATION

The present application claims priority under 35 U.S.C. § 119(a) to Korean Patent Application No. 10-2021-0020090, filed on Feb. 15, 2021, which is incorporated herein by reference in its entirety.

BACKGROUND

1. Technical Field

Various embodiments generally relate to a device for detecting an object by transforming extracted feature data and a method thereof.

2. Related Art

Autonomous driving systems may require an ability to accurately recognize objects even for new objects that have not been learned before.

For this purpose, a technology for detecting an object by applying a neural network technology is being developed.

However, a lot of data may be required for training a neural network.

Accordingly, a technique for improving object detection performance even when a neural network is trained using a small number of data may be desirable.

SUMMARY

In accordance with an embodiment of the present disclosure, an object detecting device may include a feature extracting circuit configured to extract first feature data from an input image; a feature transforming circuit configured to transform the first feature data into transformed feature data according to a transformation function; and a decoder circuit configured to decode the transformed feature data into a region map indicating a detected object.

In accordance with an embodiment of the present disclosure, an object detecting method may include generating first feature data by encoding an input image; transforming the first feature data into transformed feature data by using a transformation function; and generating a region map indicative of a detected object by decoding the transformed feature data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. These embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
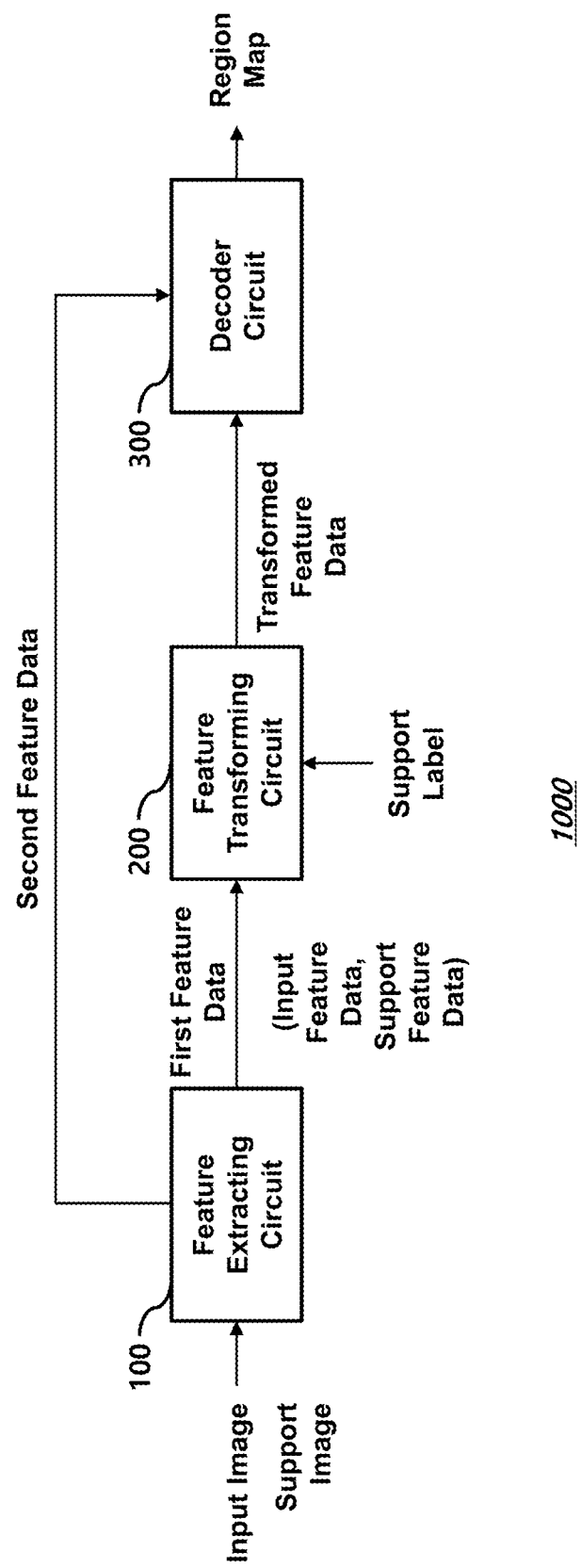
FIG. 1 illustrates an object detecting device according to an embodiment of the present disclosure.

FIG. 1 is a block diagram illustrating an object detecting device 1000 according to an embodiment of the present disclosure.

The object detecting device 1000 includes a feature extracting circuit 100, a feature transforming circuit 200, and a decoder circuit 300.

The feature extracting circuit 100 extracts feature data from an input image.

Hereinafter, the input image refers to an image input to the feature extracting circuit 100 during an inference operation.

The feature data includes first feature data provided to the feature transforming circuit 200 and second feature data provided to the decoder circuit 300.

According to an embodiment, the decoder circuit 300 may not use the second feature data.

The first feature data and the second feature data are multi-level feature data, and for example, the first feature data has a smaller size and more dimensions than the second feature data.

The feature extracting circuit 100 may generate feature data in a manner that increases number of dimensions of the input image while decreasing a size of the input image.

During an inference operation, a support image of the same class as the input image may be additionally input to the feature extracting circuit 100 to additionally generate feature data corresponding to the support image.

First feature data corresponding to the input image may be referred to as input feature data, and first feature data corresponding to the support image may be referred to as support feature data.

The feature transforming circuit 200 transforms the first feature data to the input image, that is, the input feature data to generate transformed feature data.

In an inference operation, when the input image is an image of a new object which is not included in a previously learned object class or type, the input feature data extracted from the input image is also a new data that the decoder circuit 300 has not previously learned, thus the decoder circuit 300 cannot detect an object normally using the input feature data directly.

The transformed feature data is feature data less affected by a class or type of object, and includes information sufficient to detect an object regardless of an object class.

The feature transforming circuit 200 may generate a transformation function being used to generate the transformed feature data.

A method of generating a transformation function will be described in detail below.

The decoder circuit 300 decodes the transformed feature data to generate a region map.

The region map contains information about a region where an object is located.

The decoder circuit 300 may additionally use the second feature data generated by the feature extracting circuit 100.

Figure 2:
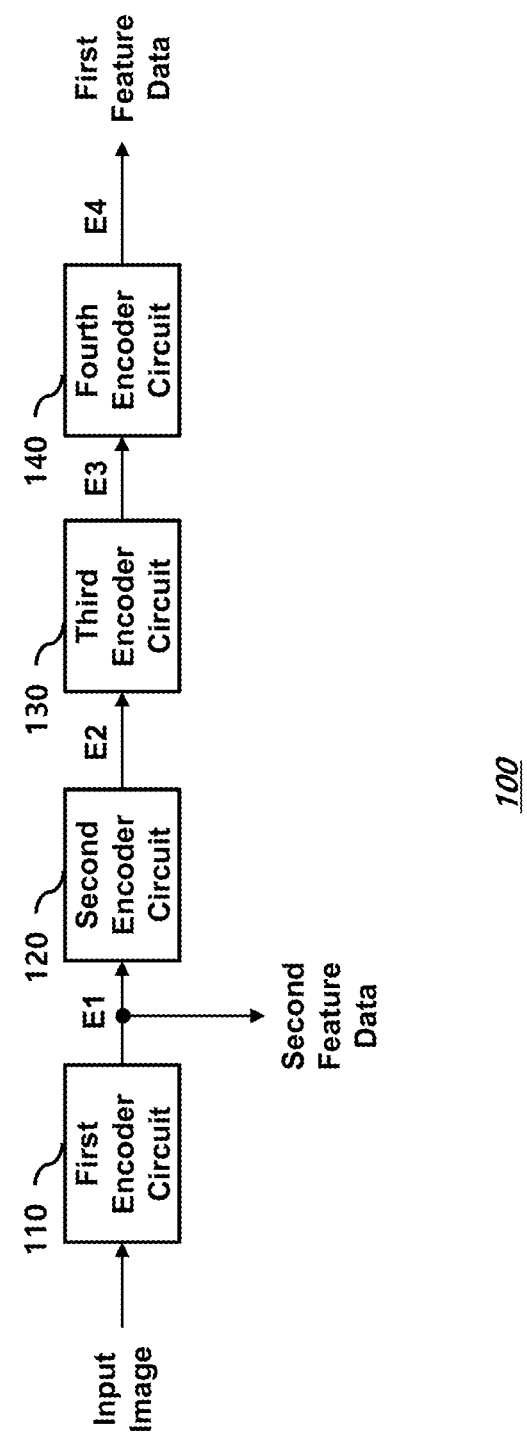
FIG. 2 illustrates a feature extracting circuit according to an embodiment of the present disclosure.

FIG. 2 is a block diagram illustrating a feature extracting circuit 100 according to an embodiment of the present disclosure. The feature extracting circuit 100 in FIG. 2 may be suitable for use as the feature extracting circuit 100 in FIG. 1.

The feature extracting circuit 100 may include a plurality of encoder circuits 110 to 140.

The plurality of encoder circuits 110 to 140 generate feature data corresponding to the input image while decreasing the size of the input image at a predetermined ratio and increasing the number of dimensions thereof in reverse.

In the embodiment of FIG. 2, the plurality of encoder circuits 110 to 140 respectively reduce or maintain the size of the input image.

For example, the size of the input image is 320×320, the size of the first encoded data E1 output from the first encoder circuit 110 is 80×80, and the second encoded data E2 output from the second encoder circuit 120 is 40×40, the size of the third encoded data E3 output from the third encoder circuit 130 is 20×20, and the fourth encoded data E4 output from the fourth encoder circuit 140 is 20×20.

In the first to fourth encoded data E1 to E4, the number of dimensions corresponding to each pixel increases in reverse.

For example, if each pixel of the input image has one dimension, each pixel of the first encoded data E1 has four dimensions, each pixel of the second encoded data E2 has eight dimensions, each pixel of the third encoded data E3 has 16 dimensions, and each pixel of the fourth encoded data E4 has 16 dimensions.

The number of encoder circuits (e.g., four in the embodiment of FIG. 2) may be increased or decreased according to embodiments.

In the embodiment of FIG. 2, the first feature data corresponds to the fourth encoded data E4, and the second feature data corresponds to the first encoded data E1.

Figure 3:
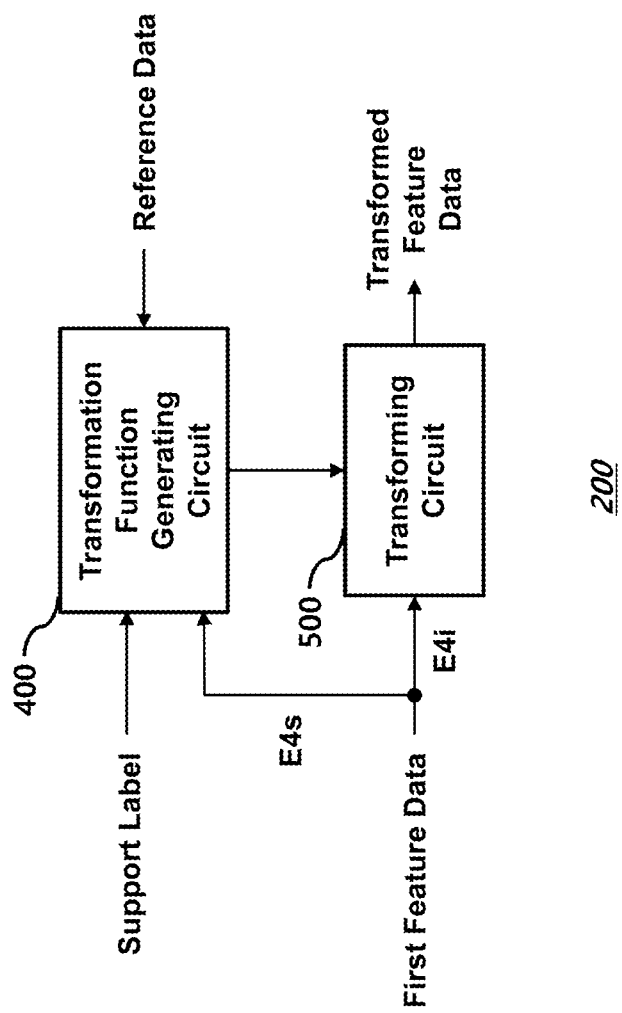
FIG. 3 illustrates a feature transforming circuit according to an embodiment of the present disclosure.

FIG. 3 is a block diagram illustrating a feature transforming circuit 200 according to an embodiment of the present disclosure. The feature transforming circuit 200 in FIG. 3 may be suitable for use as the feature transforming circuit 200 in FIG. 1.

The feature transforming circuit 200 includes a transformation function generating circuit 400 and a transforming circuit 500.

The transformation function generating circuit 400 determines a transformation function to be used in the transforming circuit 500 during an inference operation and a training operation.

In an embodiment, the transformation function may have a matrix form, and this may be referred to as a transformation matrix.

The transformation function generating circuit 400 generates a transformation function by using support feature data generated when a support image is provided to the feature extracting circuit 100, a support label corresponding to a support image, and reference data.

As described above, the first feature data corresponding to a support image is referred to as support feature data E4$s$, and the first feature data corresponding to the input image is referred to as an input feature data E4$i$.

First, prototype data is generated using the support feature data E4$s$ and a support label.

The reference data is determined through a learning or training process, and the reference data that is determined in the training process is used during an inference process (or inference operation).

A prototype data may be represented by a matrix, which is referred to as a prototype matrix C.

The reference data can also be expressed as a matrix, which is referred to as a reference matrix R.

If the transformation function is expressed as a transformation matrix P, the transformation matrix P can be calculated using the reference matrix R and the prototype matrix C according to Equations 2 and 3 as will be described below.

Since a method of generating the prototype data and a method of generating the transformation function are substantially the same as in the training operation (or training process), this will be described in detail below.

During the inference process, the transforming circuit 500 applies a transformation function to the input feature data E4$i$ and generates the transformed feature data.

Figure 4:
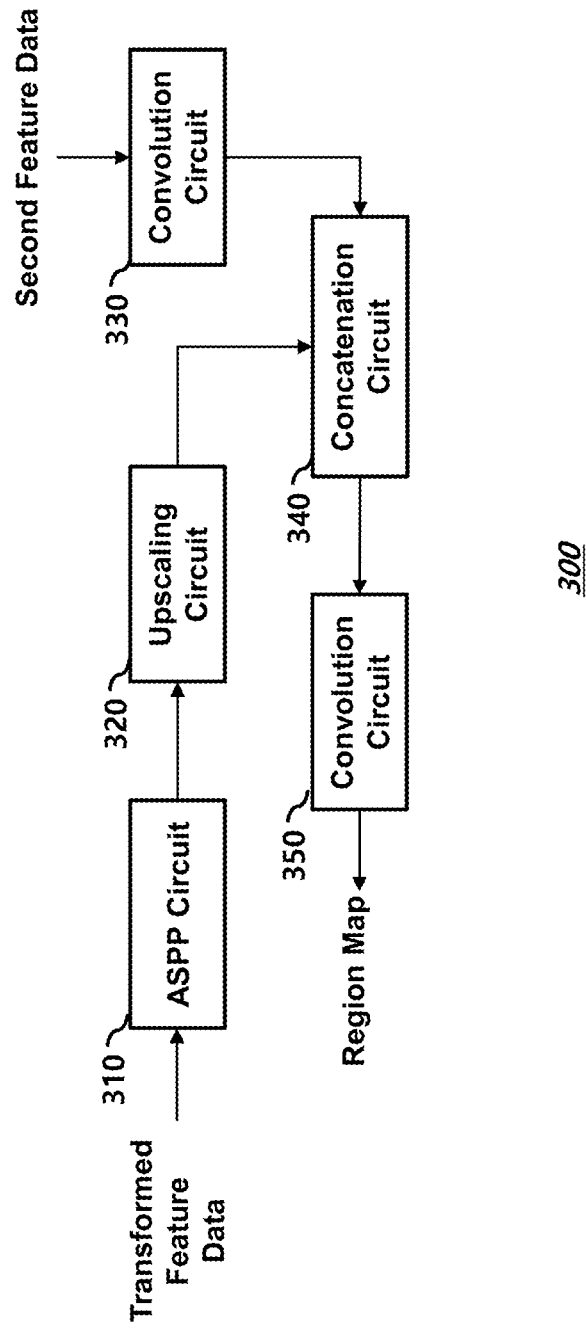
FIG. 4 illustrates a decoder circuit according to an embodiment of the present disclosure.

FIG. 4 is a block diagram illustrating a decoder circuit 300 according to an embodiment of the present disclosure. The decoder circuit 300 in FIG. 4 may be suitable for use as the decoder circuit 300 in FIG. 1.

The decoder circuit 300 shown in FIG. 4 uses the second feature data provided from the feature extracting circuit 100.

The decoder circuit 300 includes an Atrous Spatial Pyramid Pooling (ASPP) circuit 310, an upscaling circuit 320, convolution circuits 330 and 350, and a concatenation circuit 340.

The ASPP circuit 310 performs an ASPP operation on the transformed feature data. Since the ASPP operation is known in the art, a detailed description thereof will be omitted for the interest of brevity.

The upscaling circuit 320 increases the size of data output from the ASPP circuit 310.

The convolution circuit 330 performs a convolution operation on the second feature data.

The concatenation circuit 340 performs a concatenation operation on an output of the upscaling circuit 320 and an output of the convolution circuit 330.

The convolution circuit 350 outputs the region map by performing a convolution operation on an output of the concatenation circuit 340.

Figure 5:
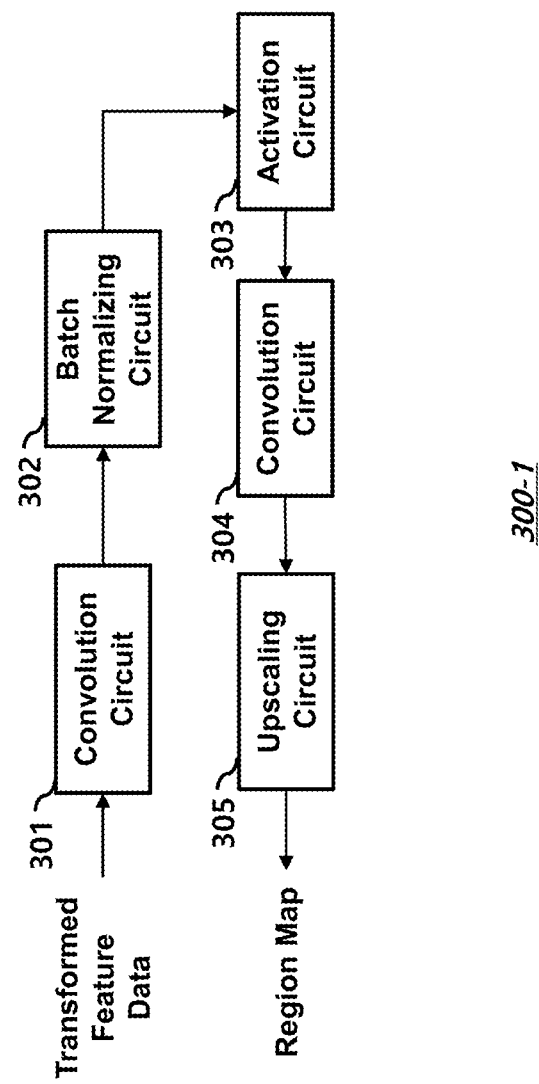
FIG. 5 illustrates a decoder circuit according to another embodiment of the present disclosure.

FIG. 5 is a block diagram illustrating a decoder circuit 300-1 according to another embodiment of the present disclosure.

The decoder circuit 300-1 does not use the second feature data provided from the feature extracting circuit 100, whereas the decoder circuit 300 in FIG. 4 uses the second feature data.

The decoder circuit 300-1 includes convolution circuits 301 and 304, a batch normalizing circuit 302, an activation circuit 303, and an upscaling circuit 305.

The convolution circuit 301 performs a convolution operation on the transformed feature data.

The batch normalizing circuit 302 performs a batch normalization operation on an output of the convolution circuit 301. Since the batch normalization operation is known to those skilled in the art, a detailed description thereof will be omitted for the interest of brevity.

The activation circuit 303 performs an activation operation. In an embodiment, the activation circuit 303 performs a Rectifier Linear Unit (ReLU) operation on an output of the batch normalizing circuit 302. Since the ReLU operation is known to those skilled in the art, a detailed description thereof will be omitted for the interest of brevity.

The convolution circuit 304 performs a convolution operation on an output of the activation circuit 303.

The upscaling circuit 305 increase a size of an output of the convolution circuit 304 to output the region map.

Figure 6:
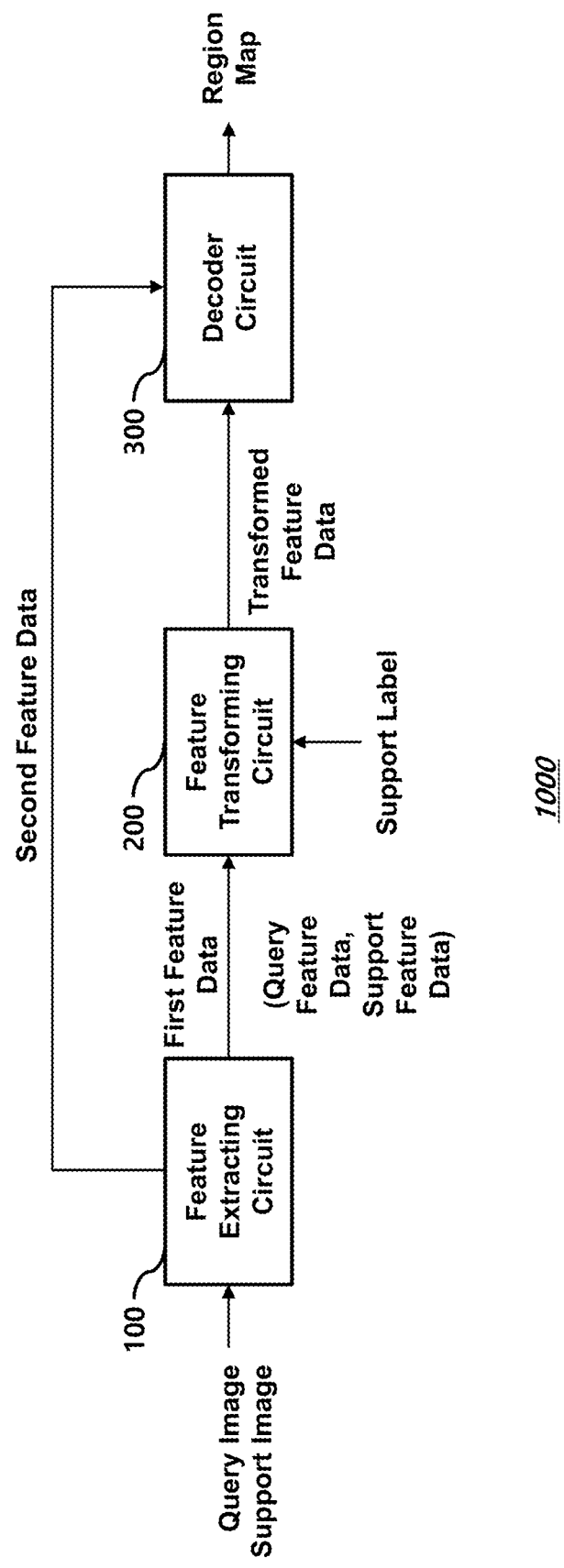
FIG. 6 illustrates a training method of an object detecting device according to an embodiment of the present disclosure.

FIG. 6 is a block diagram illustrating a training method of the object detecting device 1000 according to an embodiment.

A data set used for training the object detecting device 1000 includes a support image, a support label, a query image, and a query label.

For example, there are 800 object classes included in the data set, and each class may include 5 support images and 5 query images.

Since a support label and a query label each including foreground information and background information exist for a support image and a query image, a total number of support labels and query labels is 8,000. For example, each support label including foreground information and background information exists for a corresponding support image, and thus the total number of support labels is 4,000 (=5 support labels for each object class*800 object classes). Similarly, each query label including foreground information and background information exists for a query image, and thus the total number of query labels is 4,000 (=5 query labels for each object class*800 object classes).

During the training process, a support image, a support label, a query image, and a query label are used.

Each training step may be performed based on one class, and the next training step may be performed based on another class.

In the training process, the feature extracting circuit 100 generates first feature data from a support image and a query image, respectively.

Hereinafter, first feature data output when the support image is input to the feature extracting circuit 100 is referred to as support feature data E4$s$, and first feature data output when a query image is input to the feature extracting circuit 100 is referred to as query feature data E4$q$.

In the training process, a support label corresponding to a support image is input to the feature transforming circuit 200 to generate a transformation function.

Figure 7:
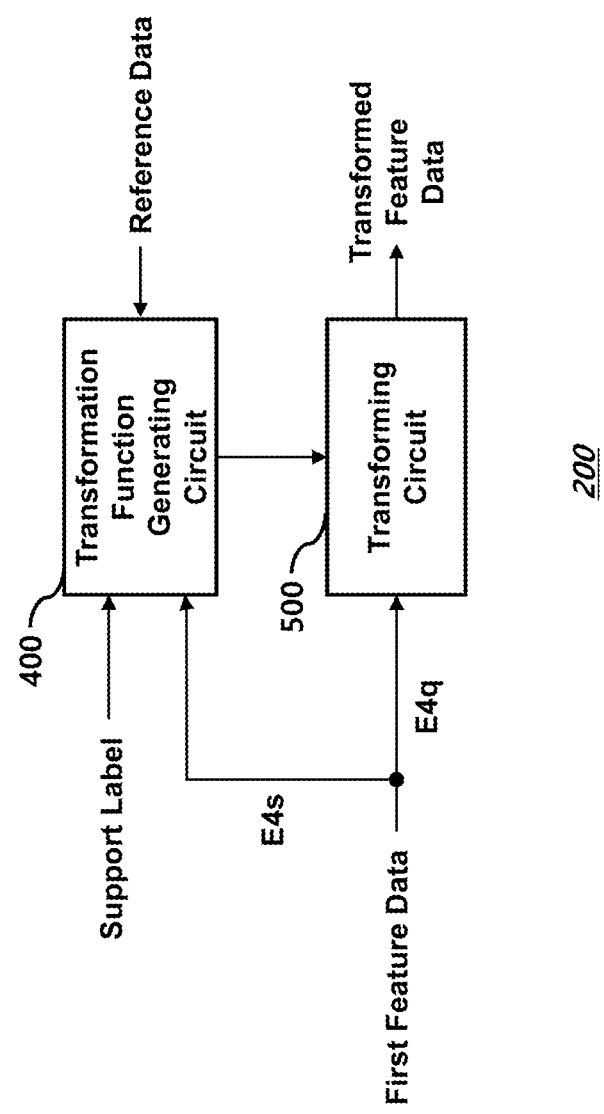
FIG. 7 illustrates a training method of a feature transforming circuit according to an embodiment of the present disclosure.

FIG. 7 is a block diagram illustrating a training method of the feature transforming circuit 200 according to an embodiment.

The feature transforming circuit 200 includes a transformation function generating circuit 400 and a transforming circuit 500.

A support label, support feature data, and reference data are input to the transformation function generating circuit 400.

The transforming circuit 500 converts the query feature data E4$q$ into transformed feature data.

The transformation function generating circuit 400 generates a transformation function. In this embodiment, it is assumed that the transformation function is represented as a matrix, and this may be referred to as a transformation matrix.

The transformation function generating circuit 400 will be described in detail below.

Figure 8:
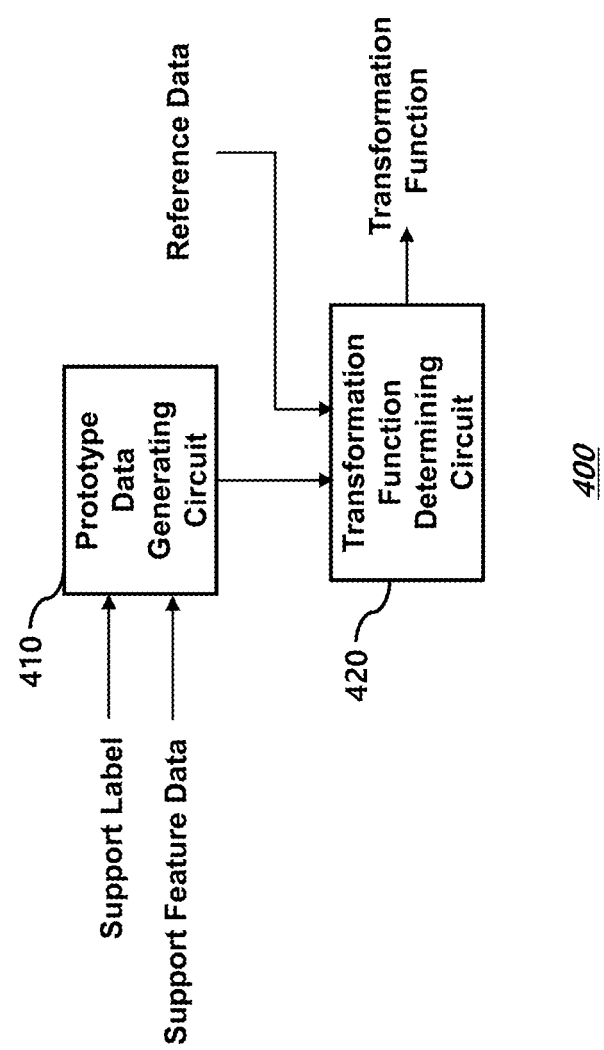
FIG. 8 illustrates a transformation function generating circuit according to an embodiment of the present disclosure.

FIG. 8 is a block diagram illustrating the transformation function generating circuit 400 according to an embodiment.

The transformation function generating circuit 400 includes a prototype data generating circuit 410 and a transformation function determining circuit 420.

Figure 9:
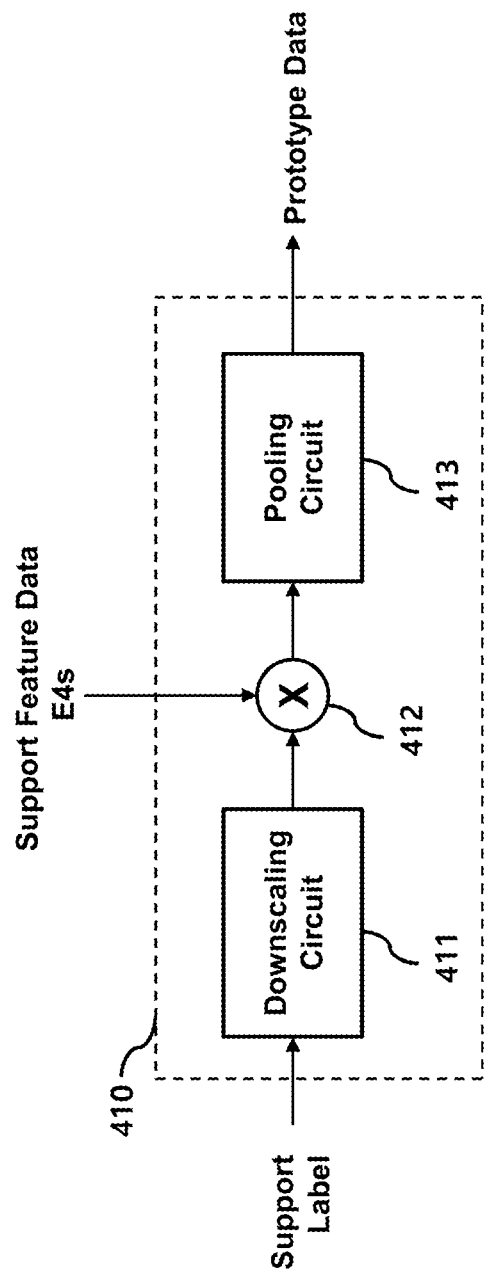
FIG. 9 illustrates a prototype data generating circuit according to an embodiment of the present disclosure.

FIG. 9 is a block diagram illustrating a prototype data generating circuit 410 according to an embodiment.

The prototype data generating circuit 410 includes a downscaling circuit 411, a masking circuit 412, and a pooling circuit 413.

The downscaling circuit 410 decrease a size of the support label to fit the size of the support feature data E4$s$ and adjusts the number of dimensions of the support label to fit the number of dimensions of the support feature data E4$s$.

For example, if the size of the support feature data E4$s$ is 20×20 and the number of dimensions is 16, the downscaling circuit 411 adjusts the size of the support label to that of the support feature data E4$s$ (e.g., 20×20) and adjusts the number of dimensions of the support label to that of the support feature data E4$s$ (e.g., 16).

The masking circuit 412 serves to mask the support feature data E4$s$ using the support label.

For example, the masking circuit 412 performs an element-wise and a dimension-wise multiplication on the support feature data E4$s$ and the support label at the same position and at the same dimension to output a result.

The pooling circuit 413 generates foreground prototype data and background prototype data from a result of the masking circuit 412.

The foreground prototype data and the background prototype data are vector data having the same number of dimensions of data output from the masking circuit 412, respectively.

The value of each dimension in the prototype data can be determined through an average pooling technique.

For example, the foreground prototype data is obtained by averaging data corresponding to foreground of an object for each dimension, and the background prototype data is obtained by averaging data corresponding to background of an object for each dimension.

In each training step, prototype data is determined using one or more support images corresponding to a selected class and corresponding support labels.

If two or more support images and corresponding support labels are used, a plurality of prototype data may be generated corresponding to support images, respectively.

In this case, final prototype data can be generated by averaging the plurality of prototype data for each dimension.

Each of the foreground prototype data and the background prototype data is vector data, and the foreground prototype data and the background prototype data may be represented as a foreground prototype vector and a background prototype vector, respectively.

For example, the prototype data may be represented as a prototype matrix C including a foreground prototype vector and a background prototype vector.

The reference data includes reference foreground data and reference background data.

Each of the foreground reference data and the background reference data is vector data, and the foreground reference data and the background reference data may be represented as a foreground reference vector and a background reference vector, respectively.

For example, the reference data may be displayed as a reference matrix R including a foreground reference vector and a background reference vector.

The reference matrix R may be initialized with arbitrary data and may be updated during a training process.

The transformation function determining circuit 420 in FIG. 8 may calculate the transformation matrix P using the reference matrix R and the prototype matrix C in the training process.

The reference matrix R, the transformation matrix P, and the prototype matrix C have a relationship as in Equation 1.

$$R=PC \quad \text{(Equation 1)}$$

In general, the prototype matrix P is not a square matrix, so there is no inverse matrix.

Accordingly, in an embodiment of the present disclosure, the approximate inverse matrix $C^+$ of the prototype matrix C may be used as shown in Equation 2 below.

$$P=RC^+ \quad \text{(Equation 2)}$$

In Equation 2, the approximate inverse matrix $C^+$ can be expressed as the following Equation 3.

$$C^+=\{C^TC\}^{-1}C^T \quad \text{(Equation 3)}$$

The transformation function determining circuit 420 generates a transformation matrix P according to Equations 2 and 3.

In each training step, as described above, a foreground prototype vector and a background prototype vector are generated using a support image and a support label included in the data set, and the prototype matrix C is generated accordingly.

Each element of the transformation matrix P is determined by applying the reference data of the current step, that is, the reference matrix R and the prototype matrix C to Equations 2 and 3. Specifically, the approximate inverse matrix $C^+$ of the prototype matrix C may be obtained based on Equation 3, and then the transformation matrix P may be obtained by multiplying the reference matrix R and the approximate inverse matrix $C^+$ as indicated in Equation 2.

The reference matrix R is updated in each training step, and the transformation matrix P is also updated accordingly.

When the transformation matrix P is determined using a support image and a support label in the training step, the transforming circuit 500 in FIG. 7 converts query feature data corresponding to a query image into transformed feature data using the transformation matrix P.

The decoder circuit 300 in FIG. 6 decodes the transformed feature data to generate a region map.

In the training process, the total loss function Lt is calculated as a sum of a transformation loss function Lp and a region loss function Ls.

The transformation loss function Lp may be calculated using a mean-squared error between the reference matrix and the transformed feature data.

In this case, the reference matrix is the reference matrix of the current training step, and the transformed feature data is obtained by transforming the query feature data by the transformation matrix determined in the current training step.

The region loss function Ls is calculated by comparing the region map output from the decoder circuit 300 and the query label corresponding to the query image.

The region loss function Ls can be calculated using a conventional technique, for example, it can be calculated using a cross-entropy loss function Lce introduced in the following article: Deng, R., Shen, C., Liu, S., Wang, H., Liu, X.: *Learning to predict crisp boundaries. In: Proceedings of the European Conference on Computer Vision (ECCV)*. pp. 562-578 (2018).

In each training step, one or more query images included in the data set can be used.

If two or more query images are used, a plurality of transformation loss functions corresponding to the query images are calculated, and an average of these can be defined as the transformation loss function Lp.

Similarly, if two or more query images are used, a plurality of region loss functions corresponding to query images are calculated, and an average of these can be defined as the area loss function Ls.

In each training step, the reference matrix R is updated in the direction of minimizing the transformation loss function Lp, the decoder circuit 300 is updated in the direction of minimizing the region loss function Ls, and the feature extracting circuit 100 may be updated in the direction of minimizing the total loss function Lt. For example, the decoder circuit 300 may include a first neural network circuit so that the decoder circuit 300 may be updated in the direction of minimizing the region loss function Ls, and the feature extracting circuit 100 may include a second neural network circuit so that the feature extracting circuit 100 may be updated in the direction of minimizing the total loss function Lt.

After that, the training step can be repeated by selecting a new class included in the data set. In a training method according to an embodiment of the present disclosure, a relatively small number of data (e.g., support labels and support images) may be used to accurately recognize new objects compared to a conventional training method.

Although various embodiments have been illustrated and described, various changes and modifications may be made to the described embodiments without departing from the spirit and scope of the invention as defined by the following claims.

What is claimed is:

1. An object detecting device comprising:
    a feature extracting circuit configured to extract first feature data from an input image;
    a feature transforming circuit configured to transform the first feature data into transformed feature data according to a transformation function; and
    a decoder circuit configured to decode the transformed feature data into a region map indicating a detected object,
    wherein the feature transforming circuit includes:
    a transformation function generating circuit configured to generate the transformation function; and
    a transforming circuit configured to transform the first feature data according to the transformation function to generate the transformed feature data, and
    wherein the transformation function generating circuit includes:
        a prototype data generating circuit configured to generate prototype data by using support feature data and a support label, the support feature data being the first feature data corresponding to a support image, the support label including foreground information and background information of the support image; and a transformation function determining circuit configured to determine the transformation function by using reference data and the prototype data.

2. The object detecting device of claim 1, wherein the feature extracting circuit includes a plurality of encoder circuits configured to sequentially change a size of the input image.

3. The object detecting device of claim 1, wherein the decoder circuit includes:
 a first convolution circuit configured to perform a first convolution operation on the transformed feature data;
 a batch normalizing circuit configured to perform a batch normalization operation on an output of the first convolution circuit;
 an activation circuit configured to perform an activation operation on an output of the batch normalizing circuit;
 a second convolution circuit configured to perform a second convolution operation on an output of the activation circuit; and
 an upscaling circuit configured to generate the region map by upscaling an output of the second convolution circuit.

4. The object detecting device of claim 1, wherein the feature extracting circuit further extracts second feature data from the input image, and the decoder circuit detects the object by using the transformed feature data and the second feature data.

5. The object detecting device of claim 4, wherein the decoder circuit includes;
 an Atrous Spatial Pyramid Pooling (ASPP) circuit configured to perform an ASPP operation on the transformed feature data;
 an upscaling circuit configured to upscale an output of the ASPP circuit;
 a first convolution circuit configured to perform a first convolution operation on the second feature data;
 a concatenation circuit configured to perform a concatenation operation on an output of the upscaling circuit and an output of the first convolution circuit; and
 a second convolution circuit configured to perform a second convolution operation on an output of the concatenation circuit to generate the region map.

6. The object detecting device of claim 1, wherein the prototype data generating circuit includes:
 a downscaling circuit configured to adjust a size of the support label to fit a size of the support feature data;
 a masking circuit configured to mask the support feature data using an output of the downscaling circuit; and
 a pooling circuit configured to generate the prototype data by pooling an output of the masking circuit.

7. The object detecting device of claim 6, wherein the prototype data includes foreground prototype data and background prototype data, the foreground prototype data and the background prototype data including foreground information and background information of an object, respectively.

8. The object detecting device of claim 1, wherein the feature extracting circuit generates query feature data and provides the query feature data to the transforming circuit, the query feature data being the first feature data corresponding to a query image, and the feature extracting circuit generates the support feature data and provides the support feature data to the transformation function generating circuit during a training operation.

9. The object detecting device of claim 8, wherein the reference data is updated according to a transformation loss function related with the reference data and the transformed feature data during the training operation, the transformed feature data being obtained by transforming the query feature data.

10. The object detecting device of claim 9, wherein the decoder circuit includes a first neural network circuit, and the decoder circuit is updated according to a region loss function related to the region map and a query label during the training operation, the query label including foreground information and background information of the query image.

11. The object detecting device of claim 10, wherein the feature extracting circuit includes a second neural network circuit and the feature extracting circuit is updated according to a total loss function during the training operation, the total loss function including the transformation loss function and the region loss function.

12. An object detecting method comprising:
 generating first feature data by encoding an input image;
 determining a transformation function according to support feature data and a support label, the support data being the first feature data generated by encoding a support image, the support label including foreground information and background information of the support image;
 transforming the first feature data into transformed feature data by using the transformation function; and
 generating a region map indicative of a detected object by decoding the transformed feature data,
 wherein determining the transformation function includes generating prototype data according to the support label and the support feature data, and
 wherein an output of the transformation function is reference data when an input to the transformation function is the prototype data.

13. The object detecting method of claim 12, further comprising generating second feature data when the first feature data is generated,
 wherein the second feature data and the transformed feature data are decoded to generate the region map.

14. The object detecting method of claim 12, further comprising updating the reference data according to a transformation loss function related with the reference data and the transformed feature data during a training operation, the transformed features data being obtained by transforming query feature data, the query feature data being generated by encoding a query image.

15. The object detecting method of claim 14, further comprising:
 updating weights of a first neural network according to a region loss function related with the region map and a query label during the training operation, the query label including foreground information and background information of the query image; and
 updating weights of a second neural network according to a total loss function including the transformation loss function and the region loss function during the training operation.

16. The object detecting method of claim 12, wherein the transformation function is represented as a transformation matrix, the prototype data is represented as a prototype matrix, and the reference data is represented as a reference matrix, and
 wherein the transformation matrix is obtained by multiplying the prototype matrix and an approximate inverse matrix of the prototype matrix.

* * * * *